United States Patent
Hoelzel et al.

[11] Patent Number: 6,149,226
[45] Date of Patent: Nov. 21, 2000

[54] FLOOR SYSTEM FOR A MOTOR VEHICLE

[75] Inventors: Guenter Hoelzel, Hochdorf; Franz Maier, Alfdorf, both of Germany

[73] Assignee: DaimlerChrysler AG, Stuttgart, Germany

[21] Appl. No.: 09/148,999

[22] Filed: Sep. 8, 1998

[30] Foreign Application Priority Data

Sep. 5, 1997 [DE] Germany .......................... 197 38 833

[51] Int. Cl.[7] .................................................. B60J 7/00
[52] U.S. Cl. .......................... 296/185; 236/187; 236/204; 236/203.03
[58] Field of Search .................................. 296/185, 187, 296/204, 203.03, 209; 298/17.7, 18

[56] References Cited

U.S. PATENT DOCUMENTS

| | | | |
|---|---|---|---|
| 2,903,295 | 9/1959 | Brahmstedt | 296/185 |
| 3,298,707 | 1/1967 | Gerin | 296/185 |
| 3,323,608 | 6/1967 | Eggert | 296/187 |
| 3,759,566 | 9/1973 | Sobey et al. | 296/185 |
| 4,371,208 | 2/1983 | Stricker | 298/18 |
| 4,573,546 | 3/1986 | Irimajiri et al. | 296/185 |
| 4,848,835 | 7/1989 | DeRees | 296/204 |
| 4,921,263 | 5/1990 | Patin | 280/62 |
| 5,040,812 | 8/1991 | Patin | 280/62 |
| 5,085,025 | 2/1992 | Gaddis | 296/204 |
| 5,597,211 | 1/1997 | Golden | 298/18 |
| 5,641,194 | 6/1997 | Honma et al. | 296/188 |
| 5,671,968 | 9/1997 | Masuda et al. | 296/204 |
| 5,704,644 | 1/1998 | Jaggi | 296/204 |
| 5,782,525 | 7/1998 | Honma et al. | 296/188 |
| 5,906,417 | 5/1999 | Golden | 298/17.7 |
| 5,934,746 | 8/1999 | Lehner | 296/204 |
| 5,944,377 | 8/1999 | Vlahovic | 296/204 |

FOREIGN PATENT DOCUMENTS

| | | |
|---|---|---|
| 0 251 906 | 1/1988 | European Pat. Off. . |
| 68 13 513 | 12/1968 | Germany . |
| 0001214 | 1/1980 | Japan ............................ 296/187 |
| 002003551 | 11/1993 | Russian Federation ............... 296/185 |

Primary Examiner—Joseph D. Pape
Assistant Examiner—Kiran Patel
Attorney, Agent, or Firm—Evenson, McKeown, Edwards & Lenahan, P.L.L.C.

[57] ABSTRACT

A motor vehicle having a floor system which has an enlarged thickness in the area of the passenger compartment, the floor system being reinforced for improving the occupant protection. In order to reduce the danger of excessive deformations of the vehicle occupant compartment in the event of a side impact of a passenger car onto the motor vehicle, the floor system has a deflecting slope on its underside, which deflecting slope, starting from the side of the floor system, extends diagonally downward toward the longitudinal center plane of the vehicle.

13 Claims, 4 Drawing Sheets

FLOOR SYSTEM FOR A MOTOR VEHICLE

BACKGROUND AND SUMMARY OF THE INVENTION

This application claims the priority of German patent 197 38 833.7-42, filed Sep. 5, 1997, the disclosure of which is expressly incorporated by reference herein.

The invention relates to a floor system for a motor vehicle, and more particularly to a floor system which is reinforced in the area of the passenger compartment.

A motor vehicle having a reinforced floor system is known, for example, from commonly-owned German Patent Document DE 39 33 417 C2, in which case, for reinforcing the floor structure, three constructionally identical, deep-drawn sheet metal plates are connected with one another in a stacked arrangement optionally with the interposition of armored plastic materials. According to such a method of construction, a floor system can be formed which, in comparison to a normally used sheet metal plate as a vehicle floor, has a considerably improved resistance to deformations. For example, also in the event of a lateral impact of another passenger car, this has a favorable effect on the occupant safety of the motor vehicle.

However, the known floor system can be used only if its circumferential contour can be kept largely constant along the thickness of the floor system and no excessive deviations in the shaping of the bottom side and the top side of the floor system are endeavored, which will frequently be the case for constructive reasons. In addition, the improved stability of the floor system in the event of a lateral impact is at the expense of a considerable weight increase, which will frequently be undesirable.

It is an object of the invention to further develop a motor vehicle having a reinforced floor system such that the danger of excessive deformations of the vehicle occupant compartment in the event of the lateral impact of another passenger car onto the motor vehicle can clearly be reduced.

This and other goals have been achieved according to the present invention by providing a floor system for a motor vehicle, having an enlarged thickness in adjacent a passenger compartment, the floor system being reinforced, wherein the floor system has at least one deflecting slope on an underside, said deflecting slope extending, starting from a side of the floor system, diagonally downward toward a longitudinal center plane of the motor vehicle.

This and other goals have been achieved according to the present invention by providing a floor system for a motor vehicle, comprising: an underbody to be arranged below a passenger compartment of the motor vehicle, said underbody including a central portion arranged at least approximately horizontally and extending in a longitudinal direction of the motor vehicle, said central portion having lateral sides, said underbody further including a deflecting slope portion extending diagonally upwardly and outwardly from each of said lateral sides of said central portion, respectively.

This and other goals have been achieved according to the present invention by providing a method of making a floor system for a motor vehicle, said method comprising the acts of: arranging an underbody below a passenger compartment of the motor vehicle, said underbody including a central portion arranged at least approximately horizontally and extending in a longitudinal direction of the motor vehicle, said central portion having lateral sides, said underbody further including a deflecting slope portion extending diagonally upwardly and outwardly from each of said lateral sides of said central portion, respectively.

The floor system of the motor vehicle designed according to the invention causes the front end of the passenger car laterally colliding with the motor vehicle to partially underride the floor system, whereby a considerable portion of the kinetic energy of the impact can be converted into a deformation of the front end which is normally constructed as a shock-absorbing deformation zone without resulting in significant intrusions of the deflecting slopes of the underbody. It is understood that the deflecting effect of the deflecting slopes will be particularly effective if they are situated at the same level as the bumpers of the colliding passenger car. However, a front end which is situated correspondingly higher could be flattened to an underriding height by a sufficiently stiff side wall.

A deflecting slope is considered to be particularly effective which, relative to the horizontal width direction of the vehicle, extends at an angle of approximately 30 degrees.

In principle, it is also contemplated to provide a deflecting slope only on the driver's side under the occupant compartment of a motor vehicle.

In order to improve the occupant protection during a lateral impact independently of the impact side, opposite deflecting slopes are expediently arranged on both vehicle sides and adjoin a plane center area of the underbody, in which case a mirror-symmetrical arrangement of the deflecting slopes is particularly advantageous also because of the uniform flow-around forces. As the result of the variation of the plane center area, the floor system can be adapted without any problem to different vehicle widths.

A particularly effective occupant protection is provided if the floor system is constructed as a thick hollow floor. A particularly good compromise between a good utilization of space in the vehicle interior and an optimal protective effect of the deflecting slopes is a course of the vehicle interior floor approximately at half the height of the deflecting slopes.

In the interest of a good utilization of space, a storage space can be provided in the hollow cross-section between the underbody and the vehicle interior floor. Because of the deflecting function of the deflecting slopes, the floor system can accommodate not only an installation space for electric and electronic control units but, because of the protected installation position, also, for example, a fuel tank for combustible fuels.

The floor system of the motor vehicle body is preferably reinforced by one or several crash cross members in order to provide the transverse stiffness not only by way of the interconnection consisting of the underbody and the vehicle interior floor. In order to nevertheless without any problems be able to lay lines or the like without any excess length in the longitudinal direction of the floor system, each crash cross member preferably extends at a sufficient distance above the underbody.

Furthermore, the floor system according to the invention is particularly suitable for vehicles which have the technology to tilt when cornering and whose body is laterally tilted when cornering approximately corresponding to the wheels of the vehicle. In this case, an adaptation of the deflecting slopes can take place to the intended maximal cornering tilt. As the result, it can be achieved that the vehicle body or the floor system does not require an excessive ground clearance in the center area in order to permit the desired cornering tilt of the vehicle. When the vehicle, which tilts when cornering, is driving straight ahead, the effect of the deflecting slopes which reduces the side impact is nevertheless maintained.

So that the reinforced floor system will not too disadvantageously affect the vehicle weight, a light metal, particularly aluminum, is provided as the material for at least portions of the floor system.

Other objects, advantages and novel features of the present invention will become apparent from the following detailed description of the invention when considered in conjunction with the accompanying drawings.

BRIEF DESCRIPTION OF THE DRAWINGS

FIG. 3a is a detail view of the underbody of FIG. 3; and

DETAILED DESCRIPTION OF THE DRAWINGS

Figure 1:
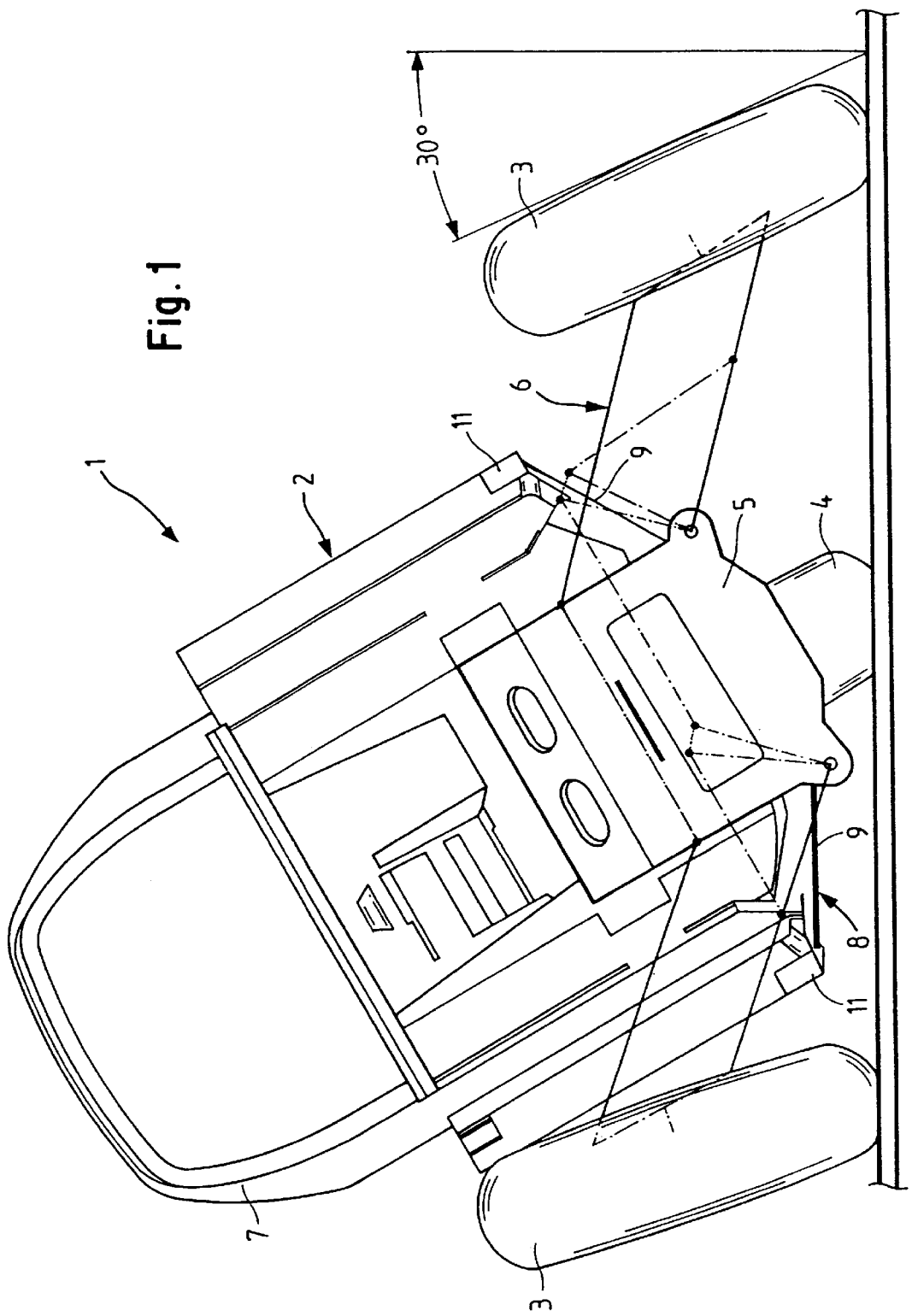
FIG. 1 is a front view of a vehicle with a cornering tilting technology during cornering with a maximal side tilt including a floor system according to a preferred embodiment of the present invention.
Figure 2:
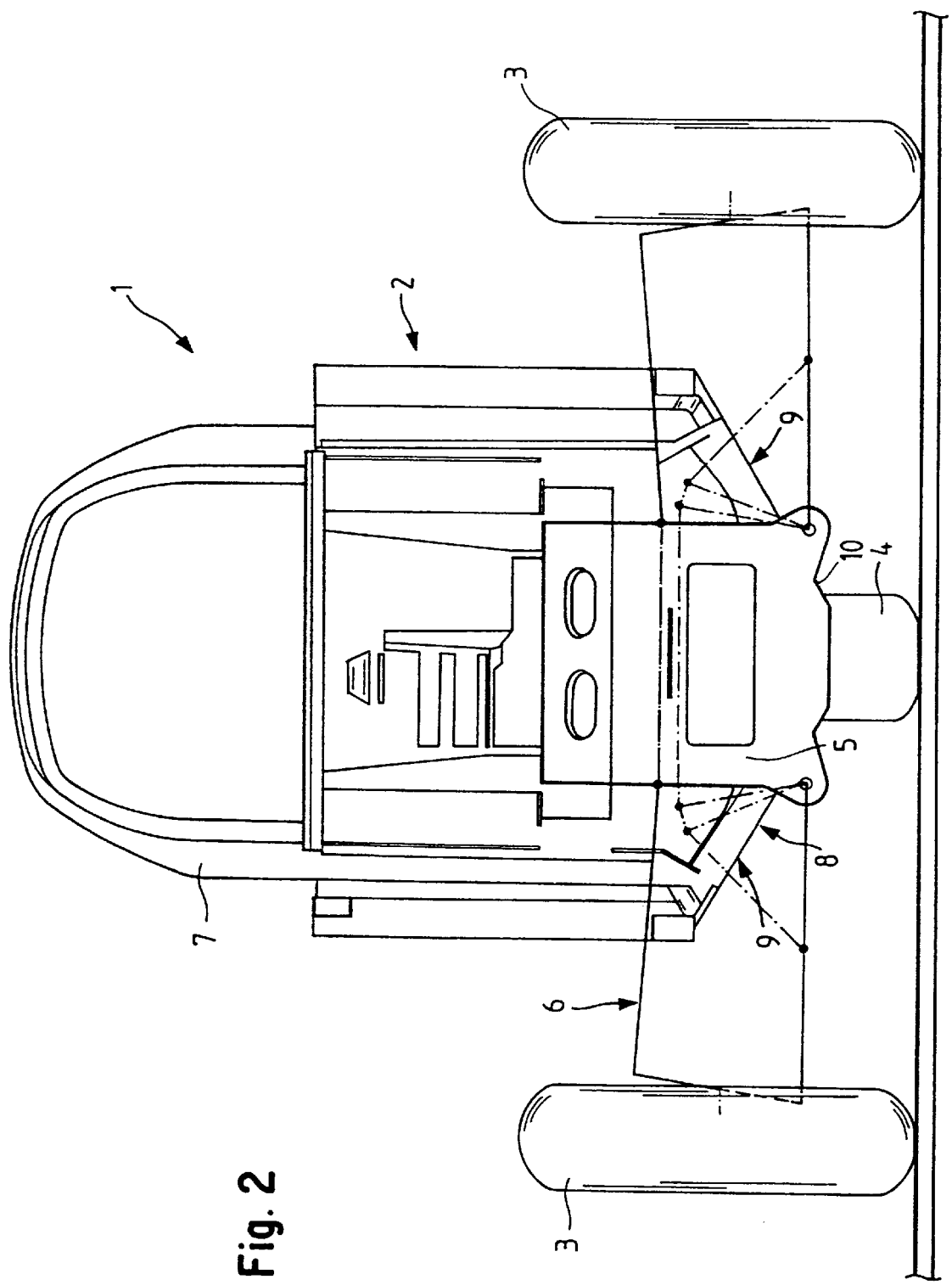
FIG. 2 is a front view of a vehicle including a floor system according to a preferred embodiment of the present invention.

Referring to FIGS. 1 and 2, a vehicle 1, which is shown from the front, has a body 2 or a chassis as the carrying vehicle body structure. The vehicle 1 is a three-wheel vehicle with two front wheels 3 arranged laterally next to the body 2 and one rear wheel 4 arranged in the center. The vehicle 1 may include cornering tilting technology which enables the body 2 and wheels 3, 4 to tilt during cornering, as is shown by the vehicle 1 of FIG. 1, shown at a maximum side tilt. However, the instant invention also covers vehicles which do not tilt during cornering, for example as shown in FIG. 2. However, FIG. 2 also represents a vehicle with cornering tilting technology (such as that of FIG. 1), when driving straight ahead. A supporting frame 5 of a rectangular cross-section which is immovably mounted on the body 2 projects from the forward front side of the vehicle body 2. Similar to a subframe, the supporting frame 5 is used for fastening the forward wheel suspensions 6 but, in contrast to conventional subframes, is rigidly connected with the vehicle body 2.

The forward wheel suspensions 6 of the steerable front wheels each have double A-arms which each guide the assigned steering knuckle and which, by way of the side walls of the supporting frame 5 are closed to form a control arm parallelogram. Between the left and the right wheel suspension, a coupling rod mechanism is also provided by means of which the wheel suspensions are coupled with one another with respect to their movements and which can be acted upon by a hydraulic cylinder arrangement against the force of an assigned spring strut. Since the front wheels 3 are steerable, the coupling rod mechanism also comprises a tie rod arrangement. The exact construction of the front axle is known from commonly owned German Patent Application 196 08 578, the entire disclosure of which is incorporated by reference herein, and will therefore not be explained in detail.

The rear wheel 4 is guided by way of a longitudinal swinging arm which is not shown and which is pivotally connected in the rear on the vehicle body 2 or chassis by means of a console. The wheel suspension of the rear wheel 4 is also not described in detail because it is conventional in a similar manner for guiding the rear wheel on the tube frame of motorcycles. Also, the tires of rear wheel 4 as well as of the front wheels 3, corresponding to conventional pneumatic tires of motorcycles, have a tread strip which is rounded in its cross-section.

Due to the design of the chassis of the tilting vehicle of FIG. 1, when cornering, a side-tilt of the wheels 3 and 4 of up to approximately 30 degrees will occur with respect to the vertical position shown in FIG. 2, in which the vehicle body 2 tilts synchronously together with the rear wheel 4. Two seats are arranged behind one another in the vehicle body 2. Since the occupants are therefore positioned in the area of the longitudinal center plane, during cornering, a riding event will take place which is very similar to that during the riding of a motorcycle and can therefore provide a lot of riding fun. Simultaneously, the occupant safety can clearly be improved with respect to a two-wheel vehicle, particularly since the vehicle body 2—as in the case of a convertible—is provided with a rollover bar 7 which spans the width of the vehicle interior, and the restraining systems which have proven themselves in motor vehicles can be used without any problem.

In order to achieve the intended side tilts of the cornering tilting vehicle 1 of FIG. 1 when the ground clearance of the vehicle body 2 is not excessive, the vehicle body 2 has a floor system 8 which is sloped on its underside laterally next to a center area having the closest proximity to the road in an adaptation to the maximally intended side tilt. When the adaptation is favorable, as illustrated in FIG. 1, it will permit a cornering with a maximal side tilt, in which case the sloped area of the vehicle body 2 on the interior side of the cornering will reach a tilt position which is largely parallel to the road.

In order to reduce the risk of injury to the occupant or occupants of the vehicle 1 in the event of a side impact of a passenger car onto its vehicle body 2, the areas on the underside of the floor system 8, which are sloped here at an angle of approximately 30 degrees with respect to the horizontal direction, are simultaneously used as deflecting slopes 9 on which the front end of the colliding passenger car is deflected under the floor system 8 (or the vehicle body 2 is deflected over the front end of the colliding passenger car due to the impact forces), possibly while deforming or flattening its deformation zone. As a result, advantageously, only one component of the impact force will still act as denting force onto the acted-upon deflecting slope 9.

Figure 3:
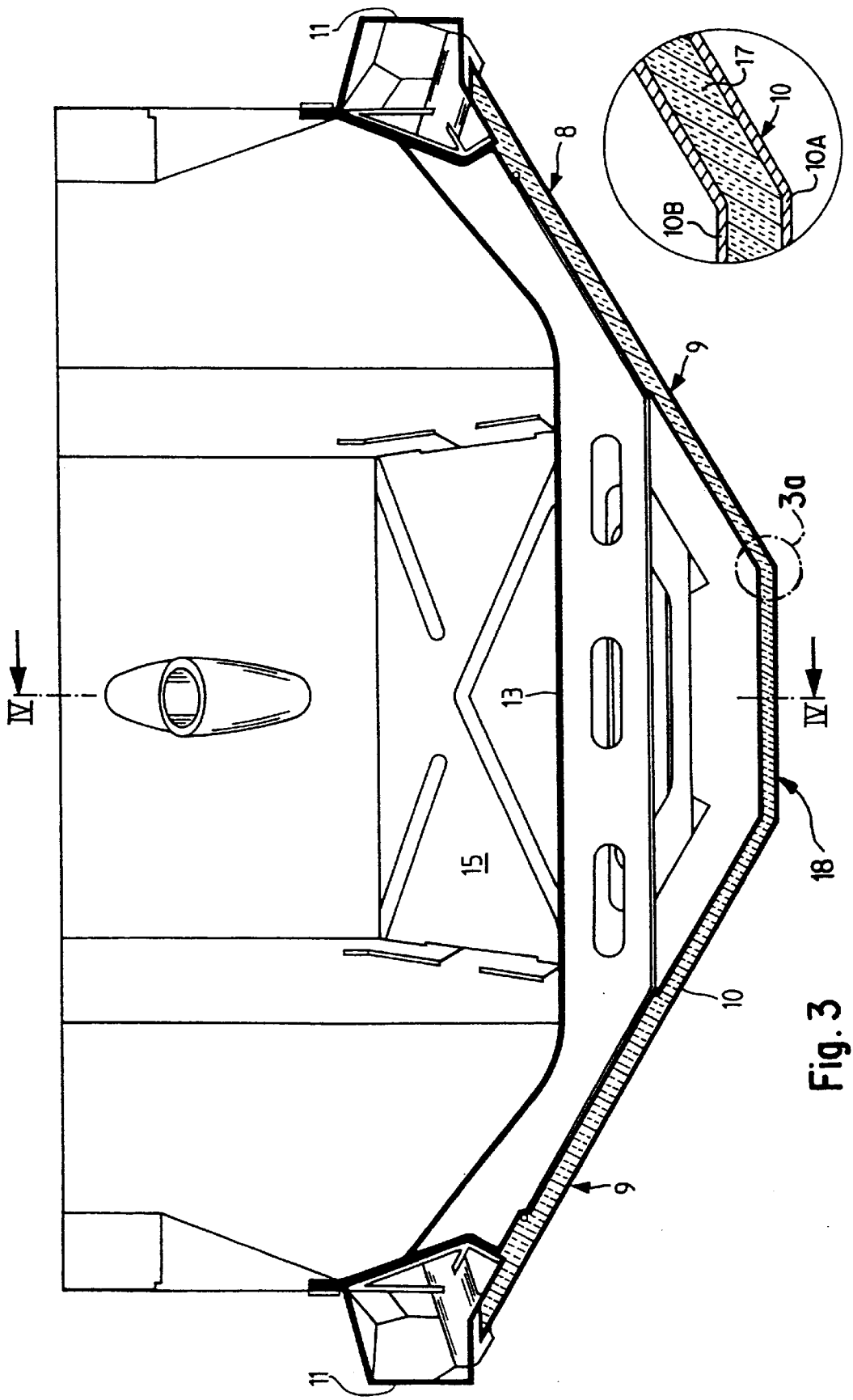
FIG. 3 is a cross-sectional view of the floor system of a vehicle including a floor system according to a preferred embodiment of the present invention taken along line III—III in FIG. 4.
Figure 4:
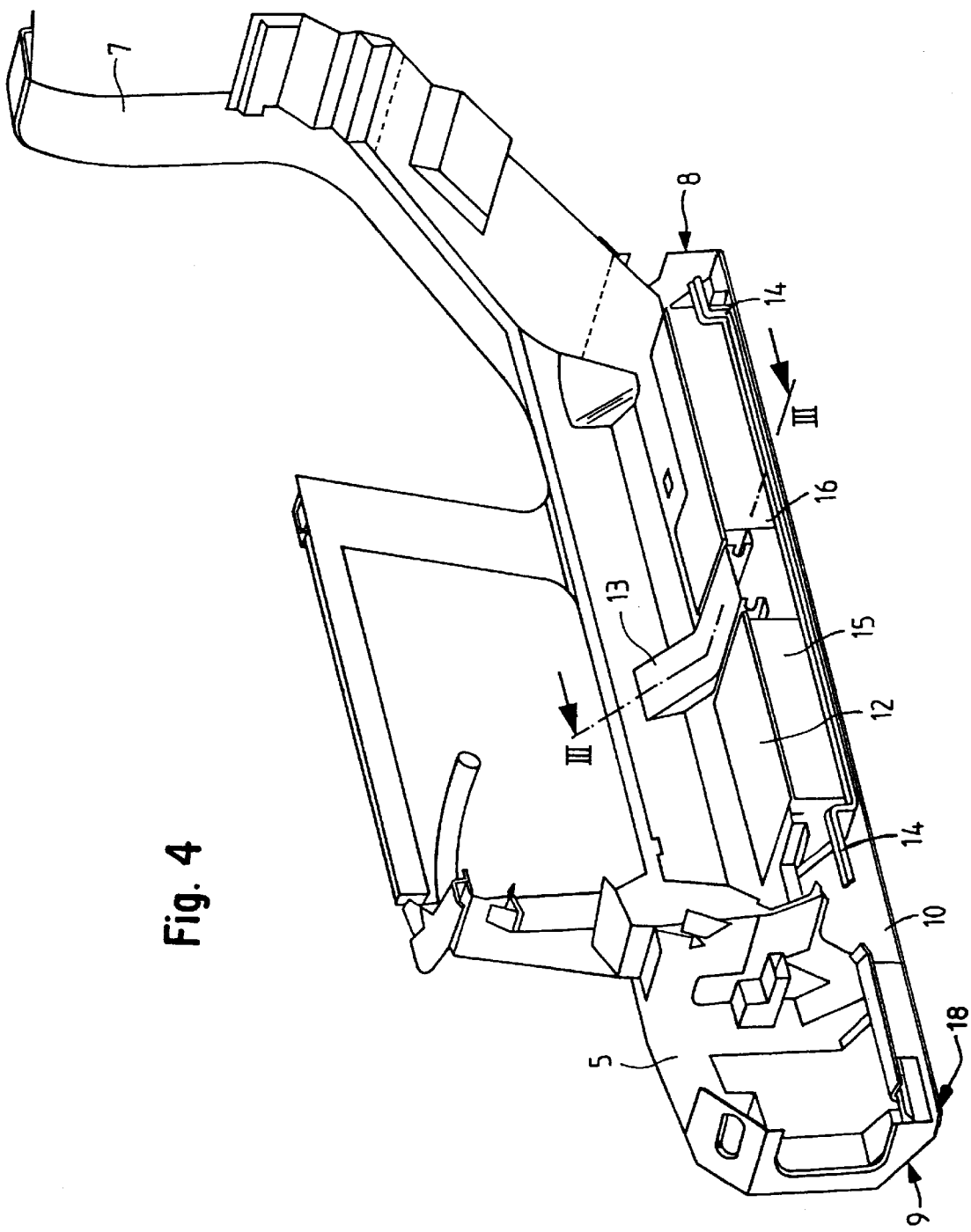
FIG. 4 is a longitudinal sectional view of the floor system in the flattened center area corresponding to the intersection line IV—IV in FIG. 3.

In order to achieve a high denting resistance of the deflecting slopes 9, the underbody 10 of the floor system 8, which has a trapezoidal trough-shaped cross-section, is shaped as a sandwich construction, an adapted core 17 made of aluminum foam being glued between two metal cover sheets 10A, 10B of a corresponding trough shape, as shown in FIG. 3a. As illustrated in the sectional view of FIG. 3, the underbody 10 ends laterally at the side members 11 made of extruded profiles which laterally bound the floor system 8. For reasons of weight, the extruded profiles, which are non-releasably connected with the underbody 10, consist of a high-strength aluminum alloy. Starting from the underside of these side members 11, as shown in FIG. 3, the deflecting slopes 9 extend straight toward the center area 18 of the underbody 10 which also extends in a straight manner, horizontally in the width direction of the floor system 8 when the vehicle body 2 is in a vertical position, as shown in FIG. 2.

In order to further improve the stability of the floor system 8 and therefore also of the vehicle body as a whole, this floor system 8 may be constructed as a hollow floor. In this case, a co-carrying vehicle interior floor 12 is situated at a considerable distance above the underbody 10 and is laterally releasably connected with the assigned side members 11.

In the front seat area of the vehicle body 2, the hollow floor is penetrated by a crash cross member 13 whose ends are connected with the lateral side members 11. The mirror-symmetrical crash cross member 13 has the task of protecting the front seat area in the event of a lateral impact in a special manner against excessive intrusions of the floor system 8. For this reason, the lateral end areas of the crash cross member 13 rest approximately along half the cross-sectional length of the deflecting slopes 9 for a direct support on the top side of the underbody 10. The center area of the crash cross member 13, which is situated between these lateral end areas, extends horizontally at a corresponding distance above the underbody 10. In a desirable manner, it therefore remains possible to lay lines 14 along the floor system without any problem.

In addition, the hollow space between the underbody 10 and the vehicle interior floor 12 can advantageously be used for housing a fuel tank 15 as well as an accommodation space 16 for electric or electronic structural elements. It is understood that, because of the laying of the lines 14, the fuel tank 15 must also, at least in areas, have a distance from the underbody.

The safety concept, which was explained by means of a vehicle 1 which may have cornering tilting technology, and has deflecting slopes for improving the occupant protection in the event of a side impact of a passenger car is, as mentioned above suitable for motor vehicles without any cornering tilting technology if their floor system is adapted thereto or suitable for this purpose.

If, for example, for reasons of design, the appearance of the deflecting slopes should be undesirable in the case of a motor vehicle, it would be possible to cover these deflecting slopes. For this purpose, it would be conceivable to use large-size plastic coverings made of PP or the like which have proven themselves as bumper aprons and can be pushed away or sheared off with relatively little resistance by the kinetic energy of a side impact.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A floor system for a motor vehicle below a passenger compartment, the floor system having an enlarged thickness and being reinforced by at least one cross member, wherein the floor system has an underbody including an underside with at least one deflecting slope and a top side on which a lateral end area of said cross member is supported, said at least one deflecting slope extending, starting from a side of the floor system, diagonally downward toward a longitudinal center plane of the motor vehicle.

2. A floor system according to claim 1, wherein the deflecting slope extends at an angle of approximately 30 degrees relative to horizontal.

3. A floor system according to claim 1, wherein the underbody has an approximately horizontally extending center area, and wherein said at least one deflecting slope is one of two deflecting slopes adjoining opposite sides of the center area, respectively.

4. A floor system according to claim 3, wherein the two deflecting slopes are arranged mirror-symmetrically relative to the longitudinal center plane.

5. A floor system according to claim 3, wherein the floor system is constructed with a vehicle interior floor situated at a distance above the underbody to define a hollow cross-section therebetween.

6. A floor system according to claim 5, wherein at least one housing space is provided in the hollow cross-section between the vehicle interior floor and the underbody.

7. A floor system according to claim 5, wherein the floor system is reinforced by at least one cross member arranged in the hollow cross-section.

8. A floor system according to claim 7, wherein at least part of the cross member extends at a distance from the underbody.

9. A floor system according to claim 4, wherein the vehicle is a cornering tilting vehicle and the deflecting slopes have angles adapted to intended maximum cornering tilts of the cornering tilting vehicle.

10. A floor system according to claim 1, wherein the floor system consists at least partially of light metal.

11. A floor system according to claim 5, wherein the underbody consists partially of light metal foam.

12. A floor system according to claim 10, wherein the floor system is laterally bounded by extruded profiles made of light metal.

13. A floor system according to claim 11, wherein the underbody is of a sandwich construction with a core of light metal foam being inserted between two metal cover sheets.

* * * * *